Figure 3:
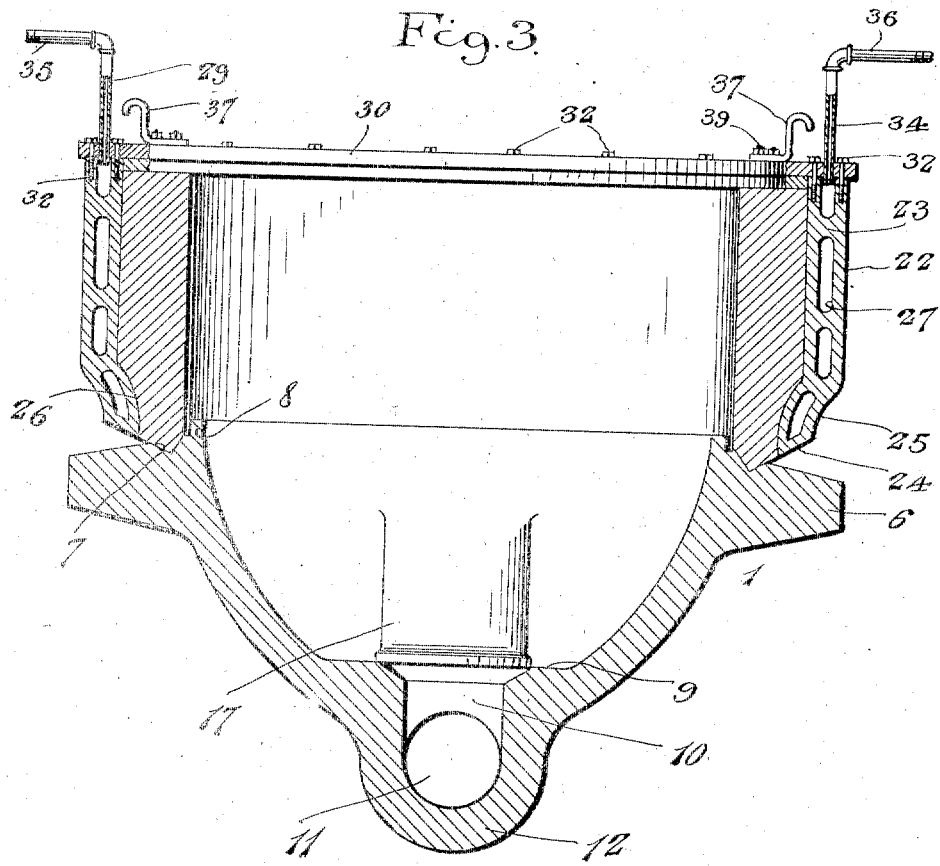

T. A. MILLER.
WINDOW GLASS BLOWING APPARATUS.
APPLICATION FILED JULY 22, 1916.
1,214,349.
Patented Jan. 30, 1917.
4 SHEETS—SHEET 1.
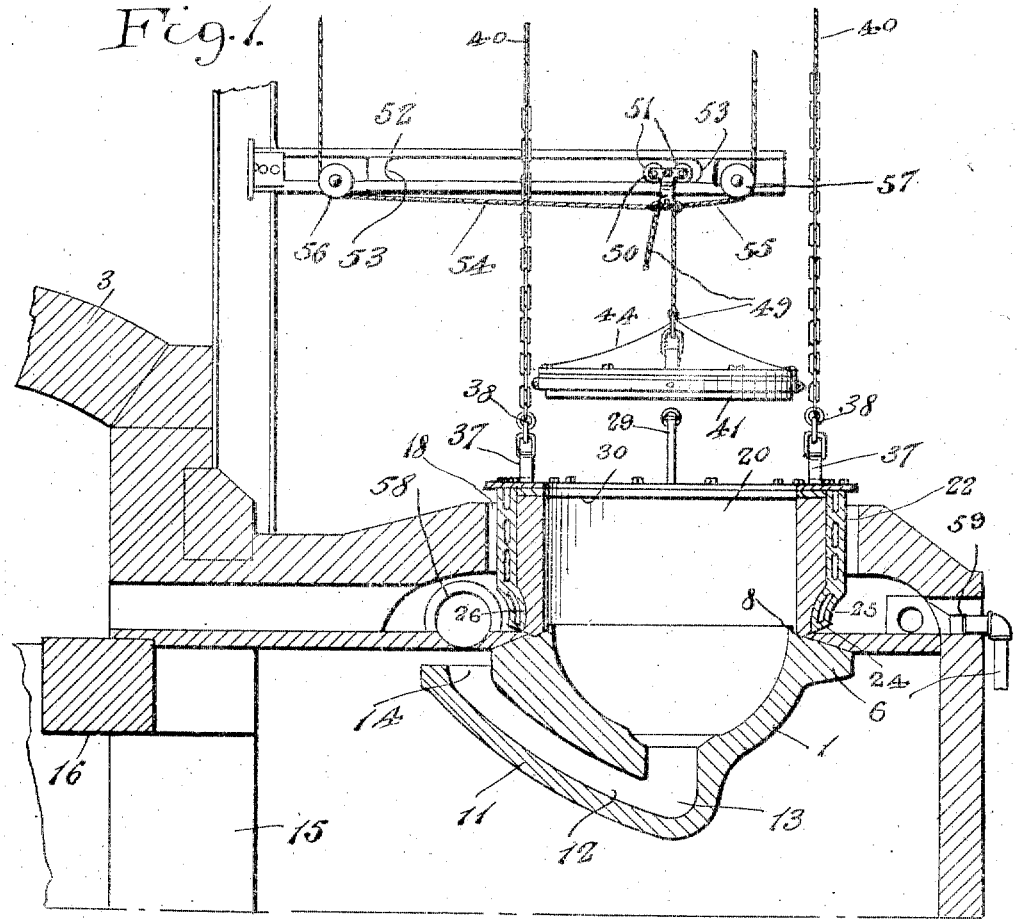
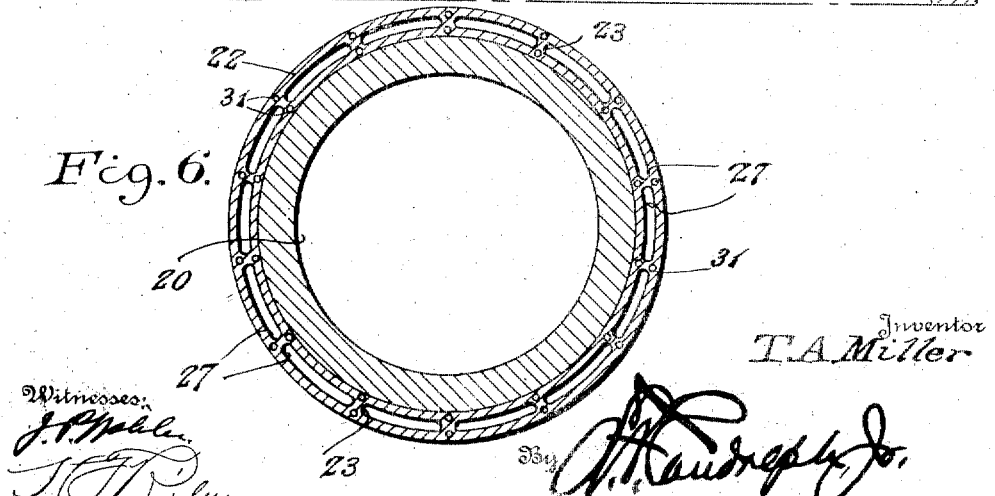

T. A. MILLER.
WINDOW GLASS BLOWING APPARATUS.
APPLICATION FILED JULY 22, 1916.
1,214,349.
Patented Jan. 30, 1917.
4 SHEETS—SHEET 2.
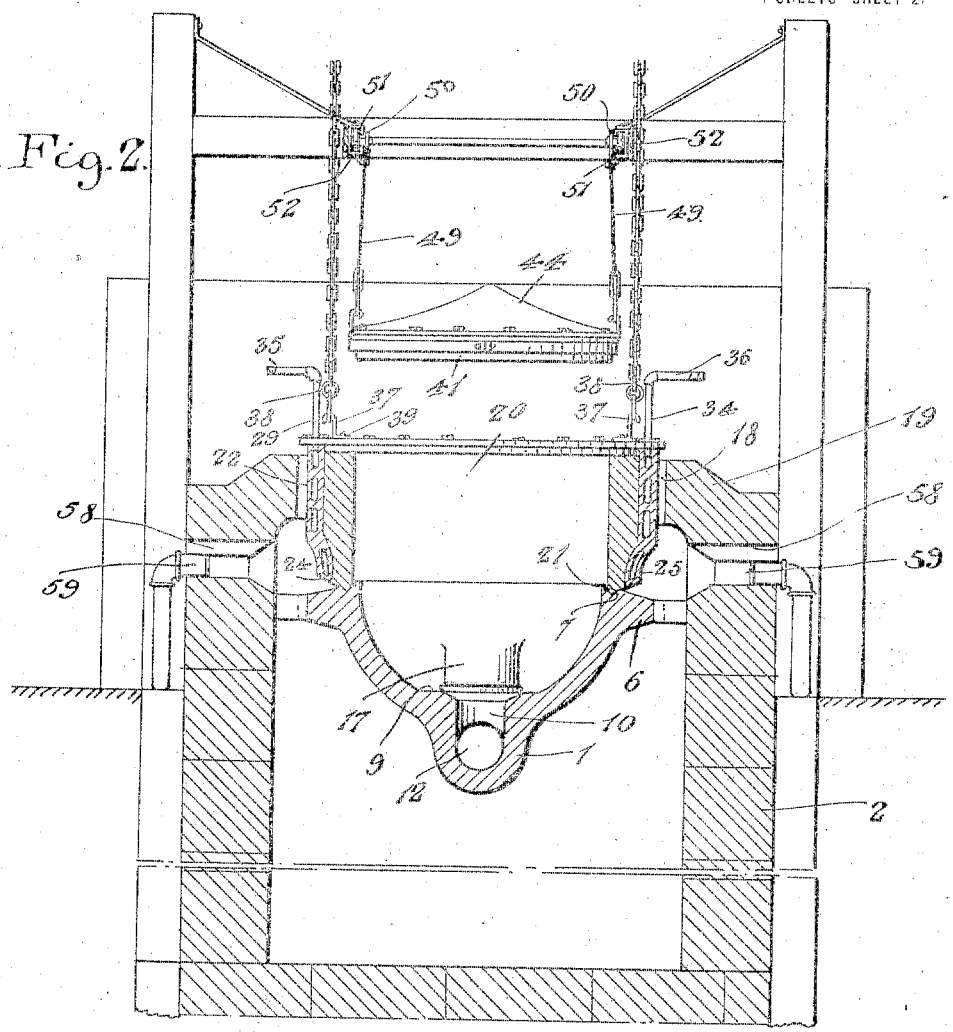
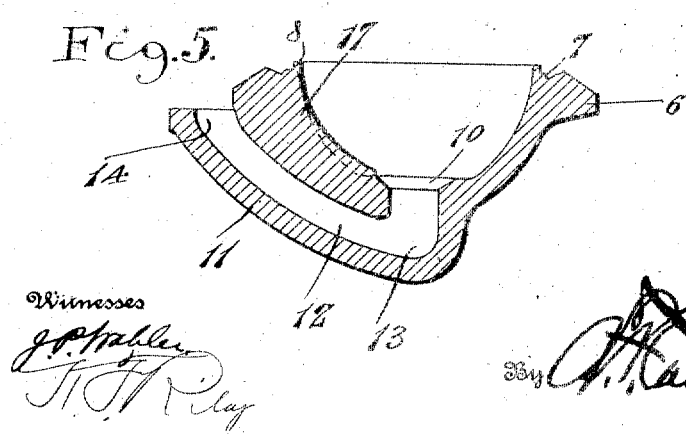

T. A. MILLER.
WINDOW GLASS BLOWING APPARATUS.
APPLICATION FILED JULY 22, 1916.

1,214,349.

Patented Jan. 30, 1917.
4 SHEETS—SHEET 3.

Witnesses:

Inventor
T. A. Miller
By
Attorney

T. A. MILLER.
WINDOW GLASS BLOWING APPARATUS.
APPLICATION FILED JULY 22, 1916.

1,214,349.

Patented Jan. 30, 1917.
4 SHEETS—SHEET 4.

UNITED STATES PATENT OFFICE.

TONY A. MILLER, OF MORGANTOWN, WEST VIRGINIA.

WINDOW-GLASS-BLOWING APPARATUS.

1,214,349. Specification of Letters Patent. Patented Jan. 30, 1917.

Application filed January 22, 1916. Serial No. 73,680.

*To all whom it may concern:*

Be it known that I, TONY A. MILLER, a subject of the King of Italy, residing at Morgantown, in the county of Monongalia and State of West Virginia, have invented certain new and useful Improvements in Window-Glass-Blowing Apparatus; and I do hereby declare the following to be a full, clear, and exact description of the invention, such as will enable others skilled in the art to which it appertains to make and use the same.

The invention relates to improvements in window glass blowing apparatus.

The object of the present invention is to improve the construction of window glass blowing apparatus and to provide a simple practical device equipped with a self-filling pot adapted to afford a continuous supply of perfectly clean and pure glass to obviate the necessity of skimming the glass or otherwise operating on the same to render it clean and pure.

A further object of the invention is to provide a window glass blowing apparatus of this character having a pot mounted in a floating position at the surface of the glass and provided with a submerged inlet and equipped with an upper section or extension adapted to form a continuation of the walls of the pot and capable also of being removed from said position to subject the glass within the pot to the action of burners for maintaining the glass in the proper condition for the blowing of window glass.

The invention also has for its object to provide means for controlling the temperature of the upper extension of the pot and to provide a cover for the extension or section adapted to be carried into and out of position to form a closure for the kiln in which the pot is mounted and also to permit the blowing tubes to be readily introduced into the pot to secure the desired quota of glass for blowing a cylinder from which the window glass is made.

With these and other objects in view the invention consists in the construction and novel combination and arrangement of parts hereinafter fully described, illustrated in the accompanying drawings and pointed out in the claims hereto appended, it being understood that various changes in the form, proportion and minor details of construction may be resorted to without departing from the spirit or sacrificing any of the advantages of the invention.

Figure 4:
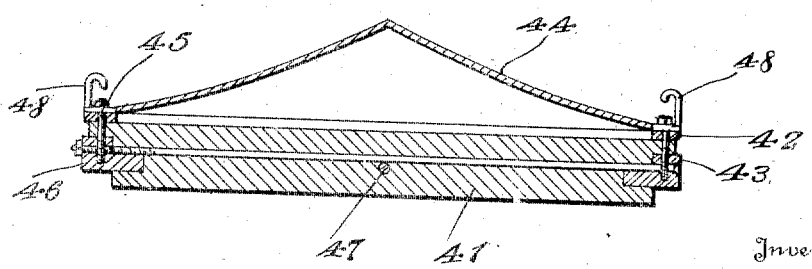
Figure 7:
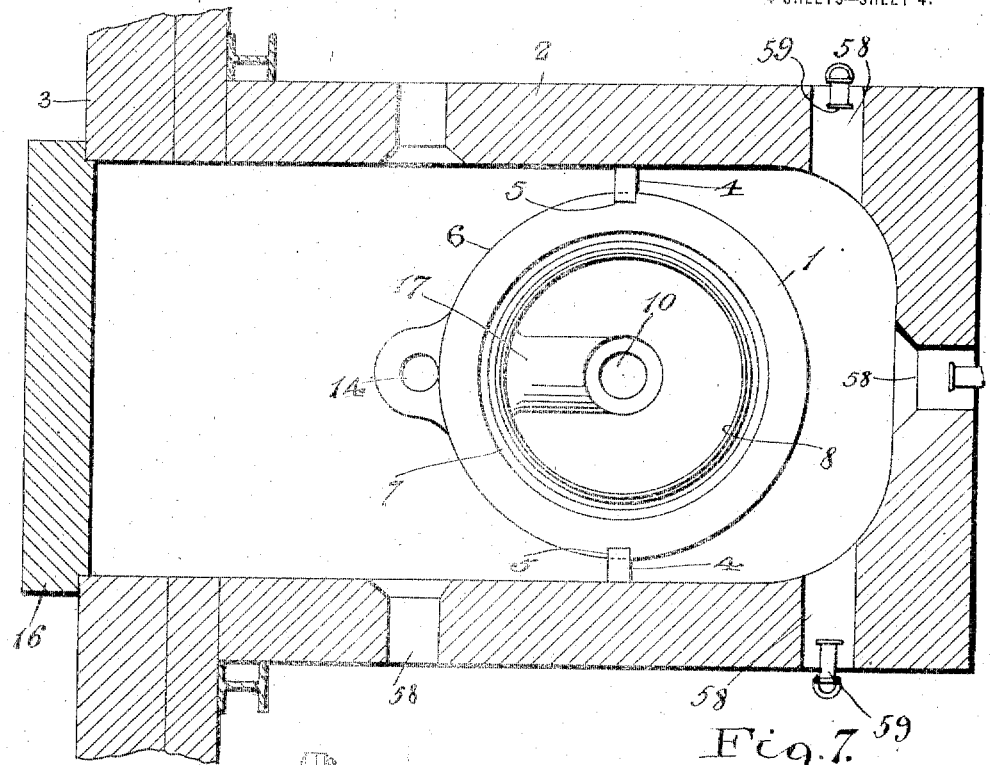
Figure 8:
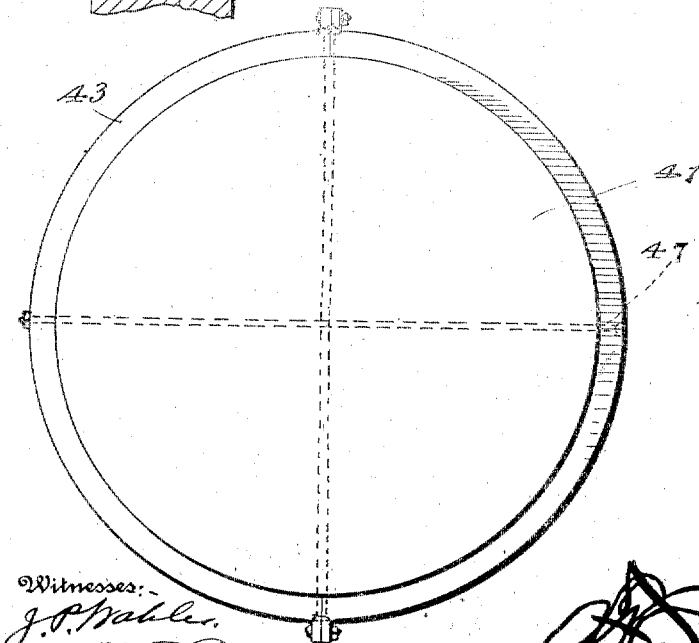

In the drawings, Figure 1 is a vertical sectional view of a window glass blowing apparatus constructed in accordance with this invention, Fig. 2 is a similar view taken at right angles to Fig. 1, Fig. 3 is an enlarged vertical sectional view illustrating the construction of the pot and the upper cylindrical extension or section. Fig. 4 is an enlarged sectional view of the cover, Fig. 5 is an enlarged detail sectional view illustrating the construction of the inlet of the pot, Fig. 6 is a horizontal sectional view through the vertically movable cylindrical upper section illustrating the construction of the metallic jacket. Fig. 7 is a horizontal sectional view of the kiln, Fig. 8 is a reverse plan view of the cover.

Like numerals of reference designate corresponding parts in the several figures of the drawings.

In the accompanying drawings in which is illustrated the preferred embodiment of the invention, 1 designates a pot designed to be constructed of clay or any other suitable refractory material and located within a kiln 2 having doorway communicating with a tank glass furnace 3. The pot 1 which is located at the surface of the glass in a floating position is rigidly held in place by opposite wedges 4 engaging notches 5 in opposite edges of an outwardly extending flange or portion 6 of the pot 1 and interposed between the latter and the opposite walls of the kiln whereby the pot is firmly secured in position. The pot 1 is preferably of annular form and the flange 6 extends outwardly from the upper portion of the pot and is provided in its upper face with a cross-sectionally tapered annular groove 7 and it has a collar or flange 8 located at the inner side of the groove and projecting above the surface of the glass. The outwardly extending annular flange or portion 6 has an inclined upper face, the groove which is formed in the said inclined face is located slightly above the surface of the glass and the said collar which is of annular form is formed integral with the pot which has curved walls sloping downwardly and inwardly as clearly illustrated in Fig. 3 of the drawings to substantially flat bottom 9. The bottom is provided with a central opening 10 and the pot is equipped with an exterior inlet 11 having a substantially cylindrical bore or passage 12 and forming an elbow 13 beneath the bottom of the pot. The inlet extends upwardly from the bottom of the pot at one side thereof and its upper end or mouth 14 is submerged being preferably located three or four inches below the surface of the glass so that nothing but pure clean glass will enter the passage and flow into the pot. By this construction and arrangement the pot is self-filling and is supplied with clean pure glass without the necessity of skimming the glass or otherwise operating on the same to secure a supply of clean glass for blowing.

The tank furnace 3 is provided at the doorway 15 of the kiln with a float 16 located at the surface of the glass and adapted to prevent impurities at the surface of the glass from flowing into the kiln whereby the glass within the kiln is maintained relatively clean and pure. The pot is preferably reinforced at 17 over the inlet 11 and it is located centrally beneath an opening 18 in the arch or top 19 of the kiln and coöperates with a vertically movable cylindrical section 20 constructed of refractory material such as clay and adapted to be raised and lowered to arrange its lower edge 21 in the annular groove 7 to form a tight connection between the upper cylindrical section and the pot when a blowing tube not shown is introduced into the pot for obtaining a supply of glass therefrom for blowing a cylinder of glass from which to form the window glass. The cylindrical section which is of a length to extend from the pot to the exterior of the arch of the kiln is tapered at its lower end 21 to fit the tapering groove 7 and it is equipped with an exterior metallic water cooled jacket 22 consisting of inner and outer shells formed integral with each other and connected at intervals by reinforcing or bracing portions 23 which may be of any desired size. The inner and outer shells are connected at the lower edge of the jacket by a wall or portion 24 and the lower portion of the jacket is curved at 25 to present a convex inner supporting face which fits a concave exterior annular face of the extension section 20 whereby the latter is supported by the metallic jacket. The inner and outer shells of the water jacket form an intervening space 27 which is supplied with water by an inlet pipe 29 which is mounted in a threaded perforation of a top ring or annular member 30 secured by screws or other suitable fastening devices to the metallic jacket and constituting a top wall for the same. The metallic jacket is provided at the top, at intervals with the connecting portions 23 and threaded perforations 31 are formed in the metal at the ends of the connecting portions for the reception of the screws 32 of the annular top wall or member. The annular top wall or member is also provided with an outlet pipe 34 for the discharge of the water after the same has been heated by its passage through the space 27. The inlet and outlet pipes will in practice be equipped with flexible hose sections 35 and 36 so as not to interfere with the upward and downward movement of the cylindrical section in raising and lowering the same to and from the pot. The inlet and outlet pipes may of course be located at any desired point and the annular member or ring 30 has secured to it substantially hook-shaped attaching members 37 which are designed to engage links of chains 38. The hooks or members 37 are provided with attaching portions 39 and the chains 38 are connected with cables 40 or other supporting means which may be connected with any hoisting mechanism for raising and lowering the upper extension section of the pot. The upper extensible section which is movable upwardly and downwardly through the opening in the arch of the kiln is equipped with a cover 41 constructed of suitable refractory material and equipped with upper and lower annular members 42 and 43 and provided with a conical metallic top section 44. The upper and lower annular members 42 and 43 which are arranged at the upper and lower faces of the periphery of the cover are connected by vertical bolts 45 and the lower annular member which may be composed of sections is preferably substantially L-shaped in cross section to provide an inwardly extending flange 46 which is embedded in the material of the body portion 41 of the cover. The lower annular member is provided with diametrically arranged crossed rods 47 which pierce the body portion 41 of the cover and assist in supporting the same and also in holding the metallic portions of the cover securely in position with relation to the refractory body portion 41. The rods which are preferably provided at one end with a head and threaded at the other end for the reception of a nut may be secured to the lower annular section in any other desired manner. The cover is provided at opposite sides with substantially hook-shaped attaching members or hangers 48 mounted on the upper annular member as clearly illustrated in Fig. 4 of the drawings and connected by suitable flexible connections 49 with a carriage 50 having rollers 51 and movable inwardly and outwardly between track bars 52 preferably formed by channeled beams and having inner and outer stops 53 but the carriage may be slidably mounted in any other desired manner as will be readily understood. The cover is raised and lowered by the flexible connection 49 and it is moved inwardly and outwardly by cables 54 and 55 arranged on inner and outer pulleys 56 and 57 and connected with any suitable mechanism.

The kiln is provided at opposite sides with apertures 58 in which are mounted gas burners 59 and the cylindrical upper section is adapted to be raised until its lower edge is approximately in the plane of the lower face of the arch or top wall of the kiln to expose the contents of the pot to the action of the flames of the gas burner and after the contents of the pot are subjected to the desired heating action the cylindrical upper section is lowered to engage its tapered or beveled lower edge with the annular groove of the pot and the cover is then lifted and moved backwardly from the opening 18 to enable the blowing pipe to be introduced into the pot to obtain the desired amount of glass for blowing a cylinder. The track enables the cover to be carried entirely away from the opening 18 to a point adjacent to the tank of the furnace. The cover forms a closure for the cylindrical section when the same is in its extended position and the cylindrical section is designed to be in its lowermost position only while the blowing tube is in operation to obtain a supply of glass from the pot. The kiln is also provided at opposite sides with skimming and setting holes 58 which are located diametrically opposite each other and opposite the inlet of the pot in the transverse vertical plane of the same.

The salient feature of the invention of prime importance is the construction of the kiln with its arched top so as to provide for an easy play of the heat when the apparatus is in operation and better when the apparatus is not in operation. The construction enables glass of an even temperature of any desired degree to be uniformly radiated to the kiln as there are no cold air drafts in the same to interfere with the proper heating of the glass.

What is claimed is:—

1. An apparatus of the class described including a glass furnace provided with a kiln having an arched top wall, said top wall being provided with an opening and a pot secured within the kiln below the said opening and extending into the glass and having a submerged inlet, said pot being provided at opposite sides with notches, wedges engaging the notches and the opposite walls of the kiln and an extension section movable through the said opening and adapted to form a continuation of the pot.

2. An apparatus of the class described including a furnace having a top wall provided with an opening, a pot located within the furnace below the said opening and having a submerged inlet and an extension section forming a continuation of the walls of the pot and movable upwardly and downwardly therefrom, said extension section consisting of a body portion of refractory material and an outer metallic water jacket, said water jacket being provided with an inwardly curved lower portion forming a support for the body portion of the extension section.

3. An apparatus of the class described including a furnace having a top wall provided with an opening, a pot located within the furnace below the said opening, and having a submerged inlet and an extension section forming a continuation of the walls of the pot and movable upwardly and downwardly therefrom, said extension section comprising a body portion of refractory material, an outer water jacket fitting the body portion and provided with a lower supporting portion, a top wall or member carrying the water jacket, a removable cover arranged upon the said top member, and supporting beams also connected with the top member.

4. An apparatus of the class described including a furnace having a top wall provided with an opening, a pot located within the furnace below the said opening, and having a submerged inlet and an extension section forming a continuation of the walls of the pot and movable upwardly and downwardly therefrom, and a cover for the extension section, comprising a refractory body portion, upper and lower metallic peripheral members adjustably connected and engaging the body portion and a substantially conical metallic top section secured to the upper member.

5. An apparatus of the class described including a glass furnace having a kiln provided with burner apertures and having opposite skimming and setting holes, a pot arranged within the furnace and having a submerged inlet located in the transverse plane of the said holes, burners mounted in the said apertures and an extension section cooperating with the walls of the pot and movable to and from the same.

In testimony whereof I affix my signature in presence of two witnesses.

TONY A. MILLER.

Witnesses:
FRANK LANTERI,
CARLO RAMELLO.